Figure 1:
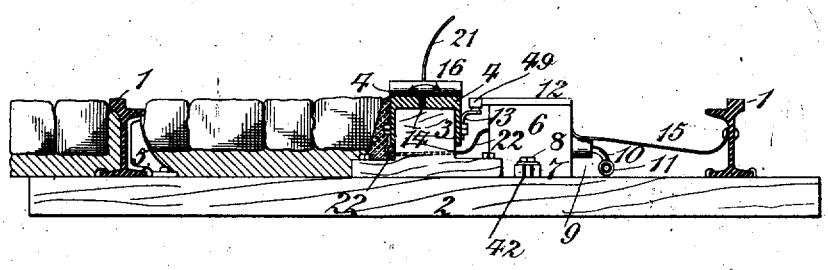

No. 11,840. Reissued July 10, 1900.

W. GRUNOW, JR.

CONTACT SYSTEM FOR ELECTRIC RAILWAYS.

(Application filed May 29, 1900.)

5 Sheets—Sheet 1.

Witnesses:
Edward L. Howland.
M. F. Keating

Inventor
William Grunow Jr.
By his Attorney
Charles J. Kintner

No. 11,840. Reissued July 10, 1900.

W. GRUNOW, JR.

CONTACT SYSTEM FOR ELECTRIC RAILWAYS.

(Application filed May 29, 1900.)

5 Sheets—Sheet 2.

Witnesses:
Edward Rowland
M. F. Keating

Inventor
William Grunow Jr.
By his Attorney
Charles J. Kintner

No. 11,840. Reissued July 10, 1900.

W. GRUNOW, JR.

CONTACT SYSTEM FOR ELECTRIC RAILWAYS.

(Application filed May 29, 1900.)

5 Sheets—Sheet 3.

Witnesses:
Edward Rowland
M. F. Keating

Inventor
By his Attorney
William Grunow Jr.
Charles J. Kintner

No. 11,840. Reissued July 10, 1900.

W. GRUNOW, JR.

CONTACT SYSTEM FOR ELECTRIC RAILWAYS.

(Application filed May 29, 1900.)

5 Sheets—Sheet 4.

Witnesses:
Edward L. Rowland.
M. F. Keating

Inventor
By his Attorney
William Grunow Jr
Charles J. Kintner

No. 11,840.

Reissued July 10, 1900.

W. GRUNOW, JR.

CONTACT SYSTEM FOR ELECTRIC RAILWAYS.

(Application filed May 29, 1900.)

5 Sheets—Sheet 5.

Witnesses
Edward Rowland
H. F. Keating

Inventor
By his Attorney
William Grunow Jr
Charles J. Kintner

UNITED STATES PATENT OFFICE.

WILLIAM GRUNOW, JR., OF BRIDGEPORT, CONNECTICUT, ASSIGNOR, BY DIRECT AND MESNE ASSIGNMENTS, TO THE McELROY-GRUNOW ELECTRIC RAILWAY SYSTEM, OF JERSEY CITY, NEW JERSEY.

CONTACT SYSTEM FOR ELECTRIC RAILWAYS.

SPECIFICATION forming part of Reissued Letters Patent No. 11,840, dated July 10, 1900.

Original No. 631,073, dated August 15, 1899. Application for reissue filed May 29, 1900. Serial No. 18,449.

*To all whom it may concern:*

Be it known that I, WILLIAM GRUNOW, Jr., a citizen of the United States, and a resident of Bridgeport, in the county of Fairfield and State of Connecticut, have invented certain new and useful Improvements in Contact Systems for Electric Railways, of which the following is a specification.

My invention is directed particularly to improvements in contact systems for electric railways like that disclosed in a prior patent, No. 586,845, granted to me on the 20th day of July, 1897; and its objects are, first, to devise for such systems of electric railways a free or independent contacting electromagnetic terminal for each branch feeder-circuit, which terminal is provided with means for effecting the preliminary excitation or magnetization thereof, so that it will be caused to automatically effect circuit connection between the current-feeder or main, the source of current-supply, and the motor or motors on board a car as it moves over the roadway; second, to combine such a free or independent contacting electromagnetic terminal with sectional contacting or working conductors in such manner that said working conductors are normally "dead" or disconnected from the current-feeder or main and adapted to be automatically connected thereto as a car or vehicle passes thereover and without the aid of magnets on board of the car; third, to provide a contact system for electric railways with free or independent contacting electromagnetic terminals located in switch-boxes or contact-receptacles, said terminals having means in the nature of coils for effecting the preliminary excitation or magnetization thereof and in such manner as to cause them to automatically close the circuit between the current-feeder or main and source of current-supply through branch feeders to the working conductors or surface contacts which supply the current directly to the motors on board a car as it passes thereover, the arrangement being such that on discontinuance of the current through said coils the terminals are caused to interrupt the circuit by reason of their own weight or by the action of gravity; fourth, to provide a contact system for electric railways with free or independent contacting electromagnetic terminals located in switch-boxes or contact-receptacles, said terminals having means in the nature of two sets of coils, one for effecting the preliminary excitation or magnetization thereof and the other for aiding the first-named coils in maintaining the electromagnetic terminals in electrical contact with the contacting or working conductors as a car passes thereover, the arrangement being such that after the circuit is broken at the surface contacts or conductors through both sets of coils each independent electromagnetic terminal will be restored to its normal position by the action of gravity; fifth, to so arrange such a system of independent contacting electromagnetic terminals, in combination with contacting or working conductors, a source of current-supply, and a current-feeder or main, that the electrically-propelled cars or vehicles may be run thereover at a higher rate of speed than was possible with the arrangement of apparatus disclosed in my before-mentioned patent and this without the use of electromagnets on the cars; sixth, to provide a free or independent contacting electromagnetic terminal having means for effecting the preliminary excitation or magnetization thereof with means for overcoming or avoiding, as may be desired, the effects of residual magnetism in the terminal, so that it will immediately detach itself from its fixed or stationary armature when the energizing current passing through the coils thereof is discontinued. These several objects are accomplished by the use of the apparatus hereinafter described, and illustrated in the accompanying drawings, the novel features of my invention being particularly pointed out in the claims at the end of the specification.

Figure 5:
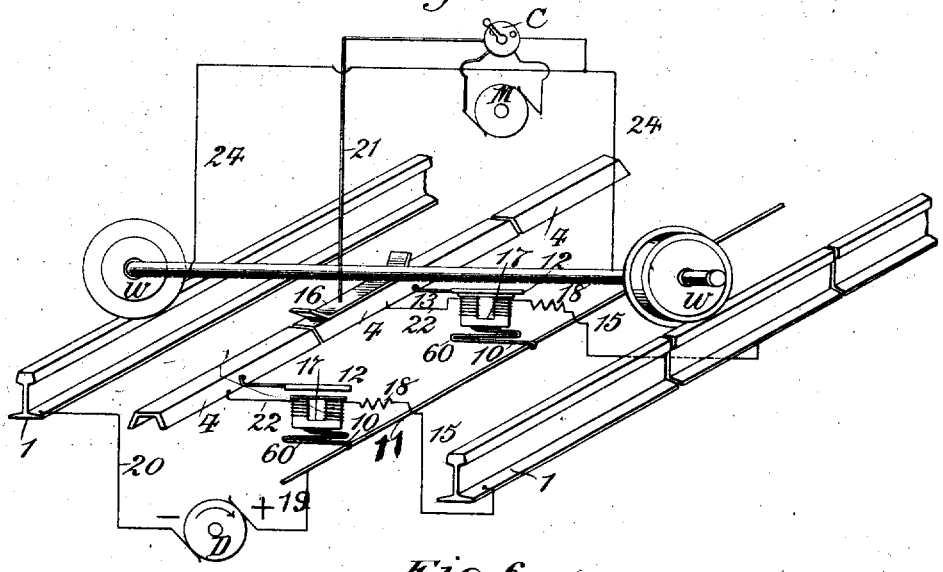
Figure 6:
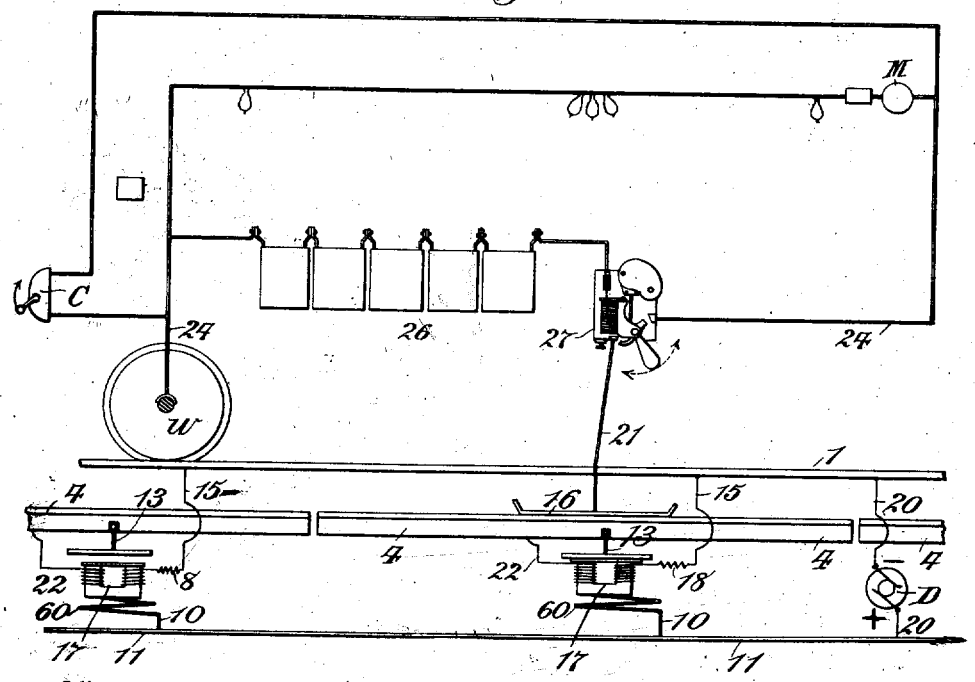
Figure 7:
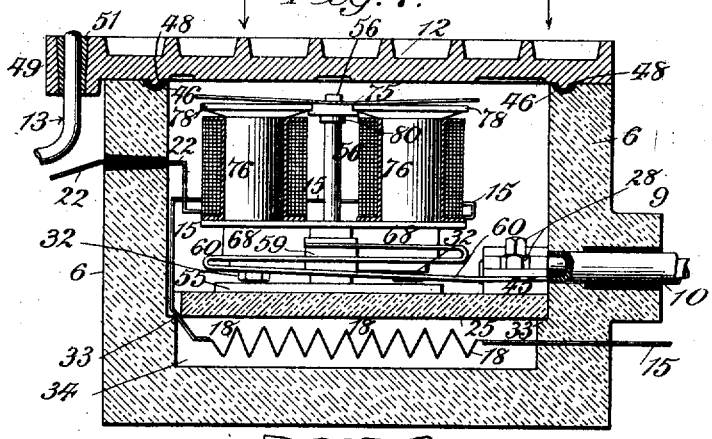
Figure 8:
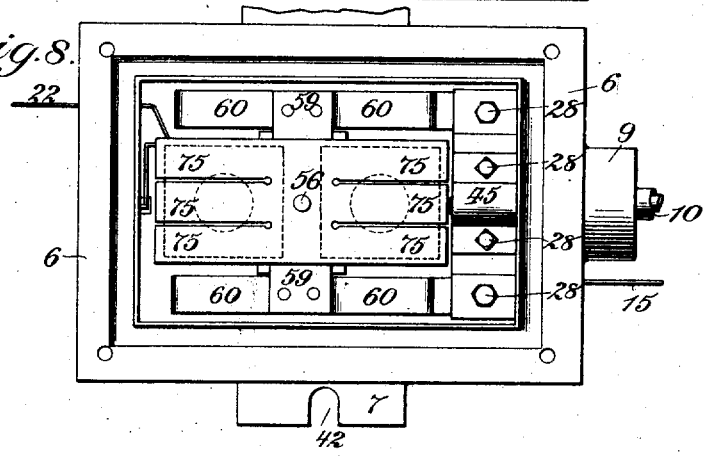
Figure 9:
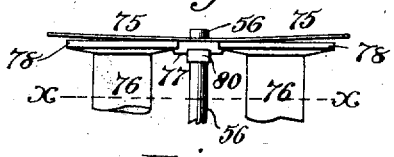
Figure 10:
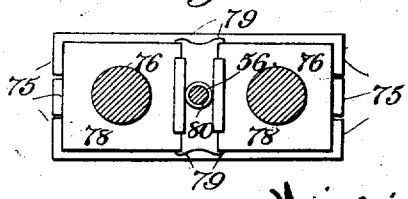
Figure 12:
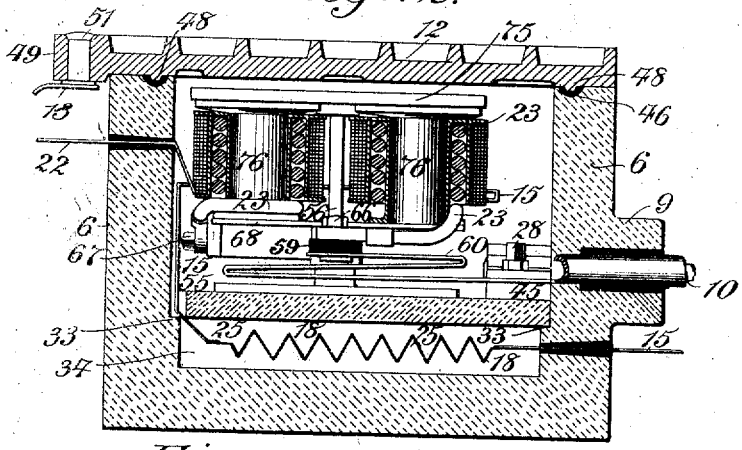
Figure 13:
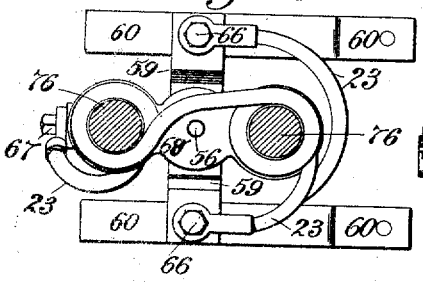
Figure 14:
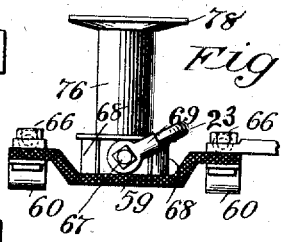
Figure 11:
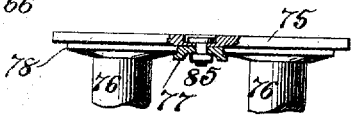
Figure 15:
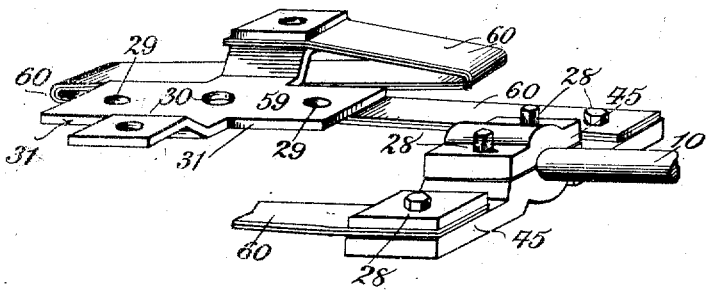

Figure 1 of the drawings is a cross-sectional view of the road-bed of a street-railway, illustrating the manner of securing the track or service rails and sections of the contacting or working conductors in position, one of the switch-boxes or contact-receptacles and the current-collector or trolley-shoe being shown in elevational view. Figs. 2, 3, 4, and 5 are part diagrammatic part perspective views illustrating various ways of applying my invention to a surface-contact system of electric railways. Fig. 6 is a side elevational view of the arrangement of circuits shown in Fig. 5, illustrating also diagrammatically a storage battery, an automatic cut-out device, a controller, and a current-collector or trolley-shoe, all carried by a car. Fig. 7 is a longitudinal sectional view of one of the switch-boxes or contact-receptacles and the inclosed free or independent contacting electromagnetic terminal, together with the circuit connections for said terminal; and Fig. 8 is a plan view of the same as seen looking at Fig. 7 from the top toward the bottom of the drawings in the direction of the arrows, the cover, however, having first been removed. Fig. 9 is a side elevational view of the enlarged upper ends or poles of the bipolar electromagnetic terminal, together with the copper contact-plate thereof, illustrating also the manner of attaching the same to the magnetic poles of the terminal; and Fig. 10 is a transverse sectional view of the same, taken through Fig. 9 on the line *x x* and as seen looking thereat from the bottom toward the top of the drawings. Fig. 11 is a view similar to Fig. 9 of a modified form of that part of the terminal, illustrating a carbon contact-plate in place of the copper contact-plate. Fig. 12 is a sectional view similar in all respects to Fig. 7, except that the added feature of the feeder-coils, which aid the shunt-coils in holding the terminal in its upper or contacting position are here shown. Fig. 13 is a top plan view of the feeder-coils about the bipolar magnetic terminal cores, illustrating also the electrical connection thereof with the flexible bands or conductors, which permit the electromagnetic terminal to partake of a free or independent movement, the shunt-coils being omitted in this view for clearness sake; and Fig. 14 is a side elevational view thereof as seen looking at Fig. 13 from the left toward the right, the feeder-coils, however, being omitted in this view. Fig. 15 is a perspective view of the flexible bands or conductors, which permit the magnetic terminals to partake of free or independent movement, this figure illustrating also the manner of connecting said bands or conductors to one of the branch feeders.

Like numerals and letters of reference represent similar or equivalent parts wherever used throughout this specification and in the drawings accompanying the same.

Referring now to the drawings in detail and first to Fig. 1 thereof, the numeral 1 represents the track or service rails of usual construction, spiked or otherwise secured to cross-ties 2, upon which is secured a continuous stringer or timber 3, of creosoted wood, or, if preferred, creosoted wooden blocks may be substituted therefor. To the upper surface of the timber 3 are secured in any preferred manner twin or double contacting or working conductors 4 4 of any preferred form, and the ends thereof may be inclined or beveled, so as to lessen the impact of the current-collector or trolley-shoe as it passes thereover.

If desired, a metallic brace 5 may be secured to the cross-ties inside of the track or service rails 1 1 to provide additional strength and rigidity therefor. Said track or service rails are suitably bonded or connected together so as to constitute a return-conductor for the current to the power-house dynamo or generator.

6 represents one of the water-tight switch-boxes or contact-receptacles, preferably secured by spikes or bolts 8, extending through openings 42 in lugs or ears 7 into the cross-ties. (See also Fig. 8.) Each of these switch-boxes or contact-receptacles 6 is provided with a tubular projection 9, adapted to receive a branch feeder 10, connected to the current-feeder or main 11, as shown. Said switch-boxes or contact-receptacles 6 are also provided with metallic tops or covers 12, preferably of magnetic material, for the purpose of constituting fixed or stationary armatures for the movable, free, or independent contacting electromagnetic terminal in said boxes, as will be more fully described later on. Each of these tops or covers 12 is connected by a bond-wire or conductor 13 with its adjacent contacting or working conductor 4, and, if preferred, said working conductors may be separated longitudinally by any suitable insulation 14, that section of the contacting or working conductor 4 more remote from the switch-box or contact-receptacle 6 being preferably connected directly to one of the track or service rails 1 by a shunt-conductor 22 15, which includes in its circuit the coils of the electromagnetic switching mechanism within the box, but not shown in this figure of the drawings.

16 is a current-collector or trolley-shoe of any preferred form, adapted at all times to rest upon and bridge the contacting or working conductors 4 4, said trolley-shoe being carried by a car in any preferred manner and connected electrically with the controller, motor, and general wiring of a car by a conductor 21, as shown in Figs. 2, 3, 4, and 5.

Figure 2:
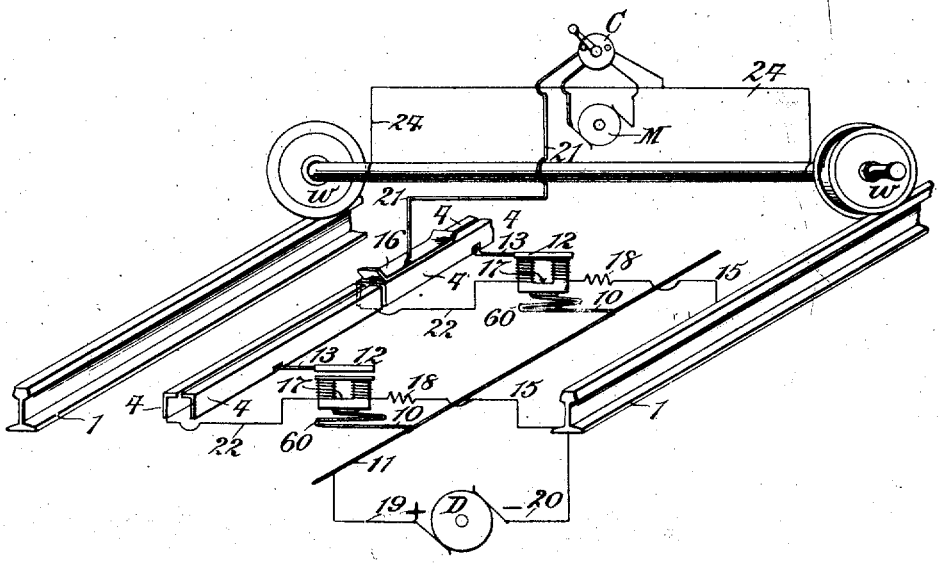

In Fig. 2 is illustrated twin or double sectional contacting or working conductors 4 4, one of which is connected by the bond-wire or conductor 13 with the top or cover 12 of the switch-box or contact-receptacle, the other being connected directly to one of the track or service rails by the shunt-conductor 22 15, which includes in its circuit the coils of a free or independent contacting electromagnetic terminal 17, constituting the movable part of the electromagnetic switching mechanism and a resistance-coil 18 for reducing the current flowing through said coils, the cores of said electromagnetic terminal being connected to flexible bands or conductors 60, (see Figs. 7 and 15,) electrically connected with a branch feeder 10, which in turn is connected directly to the current-feeder or main 11. D is a power-house dynamo or generator constituting the source of current-supply and having its opposite poles connected by conductors 19 and 20 directly to the current-feeder or main 11 and one of the track or service rails 1. *w w* represent the wheels of a tram-car, one of the axles of which is connected by a conductor 24 with a controller C, connected to an operating-motor M, said controller being connected in turn, as before indicated, by a conductor 21 with the current-collector or trolley-shoe 16. The twin or double working conductors 4 4 are preferably divided into sections of predetermined lengths insulated from each other throughout their lengths and at their adjacent ends and each provided with a free or independent contacting electromagnetic terminal 17, inclosed in a water-tight switch-box or contact-receptacle 6, the arrangement being such that said terminals are actuated successively as a car passes over the route in either direction, and are thus caused to electrically connect the current-feeder or main through the cores thereof with stationary armatures electrically connected by bond-wires or conductors 13 with the sectional working conductors, and hence supply current thereto and to the propelling-motor on board the car through the current-collector or trolley-shoe 16, said terminals being demagnetized as the current-collector or trolley-shoe leaves or departs from the corresponding sectional conductors.

Figure 3:
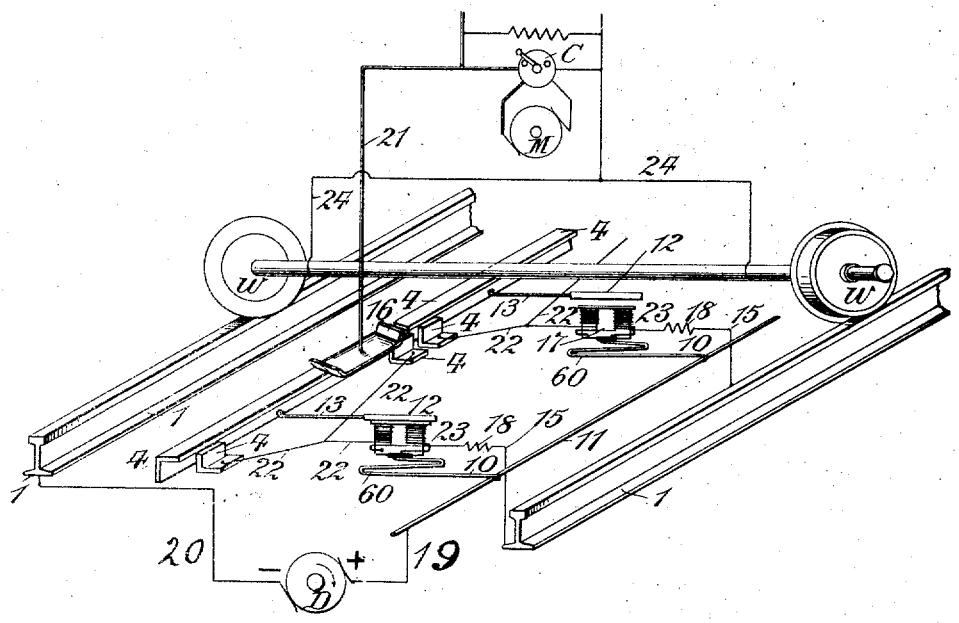

In Fig. 3 is shown a construction similar to that illustrated in Fig. 2, with the exception that the contacting or working conductors 4 4 instead of being arranged in duplicate pairs of equal length, as shown in Fig. 2, are so constructed that the left-hand set is substantially like the corresponding set illustrated in Fig. 2, while the right-hand set is composed of short contacting or working conductors 4 4, located at the opposite ends of the first-named sets and connected by a two-part shunt-conductor 22 with the preliminary excitation or energizing coils of the electromagnetic terminal, resistance 18, and the shunt 15 to one of the track or service rails 1. A second energizing or magnetizing coil 23 of very much lower resistance is wound in the same direction around the poles of the magnetic terminal and one end thereof connected directly to the core of the magnetic terminal 17, so that when said terminal is lifted to its upper position the second set of coils 23 aids the first-named coils in maintaining the terminal in its upper or closed position, the entire working current passing through the coils 23, as will be evident on inspection of the drawings. The details of this structural arrangement with relation to the electromagnetic terminal will be more particularly pointed out in connection with the description of Figs. 12 to 14, inclusive.

Figure 4:
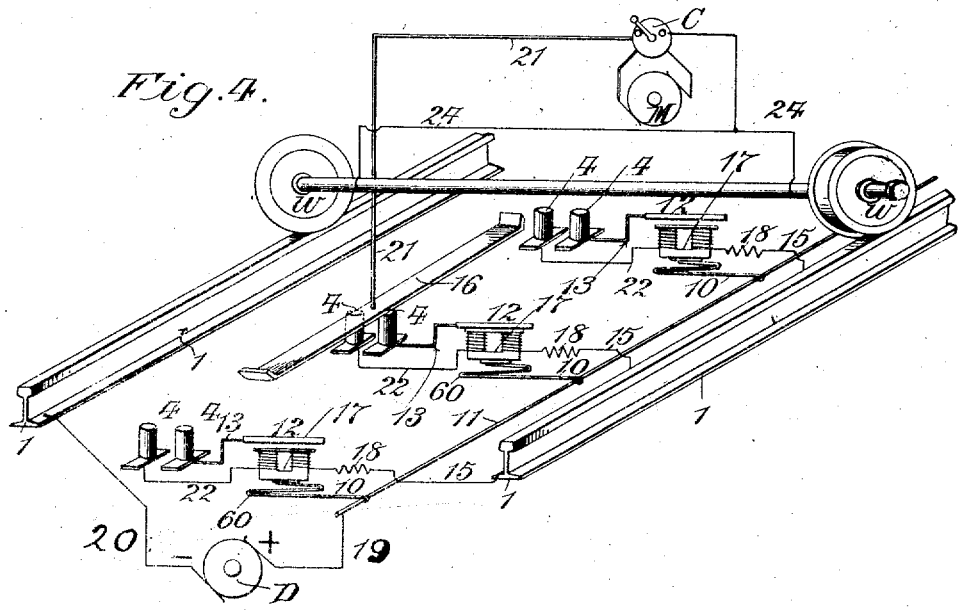

A still further modified arrangement of circuits is illustrated in Fig. 4 of the drawings, in which the contacting or working conductors 4 4 are in the nature of contacting pins or blocks located in pairs at stated intervals, the circuit connections from said contacting or working conductors being as before by bond-wire or conductor 13 to the tops or covers 12 and by the shunts 22 15 to the coils of the electromagnetic terminals 17 and resistances 18, the current-collector in this instance being substantially the length of the distance between the successive pairs of contacting or working conductors 4 4, the circuit arrangements otherwise being not substantially different from those disclosed in connection with Fig. 2 of the drawings.

In Fig. 5 I have illustrated a still further modified arrangement of circuits in which only one set of contacting or working conductors 4 4 is utilized, said conductors being arranged in line with each other and the circuit connections such that as the current-collector or trolley-shoe 16 passes thereover the electromagnetic terminals will be actuated in succession.

In Fig. 6 of the drawings I have illustrated a separate means for effecting the preliminary excitation or magnetization of the contacting electromagnetic terminal 17, the same consisting of a storage battery 26 of the required voltage carried by the vehicle or car, together with an automatic switch or magnetic blow-out 27, of any well-known form, for disconnecting the storage battery when the working current from the power-house dynamo or generator D is reëstablished and operatively connected through the electromagnetic terminals to the controller C and motor on board of the car, the arrangement of the surface-contact system shown in this figure of the drawings not being substantially different from that illustrated in Fig. 5. I make no claim, however, to this added feature, and the same is only shown in the present instance for the purpose of illustrating how, if desired, the current may be restored to the electromagnetic terminal when lost by reason of derailment of the car, sudden stoppage of the power-house dynamo or generator D, or in any other manner.

Referring now to Figs. 7 to 15, inclusive, for a detailed description of the switch-boxes or contact-receptacles and the inclosed contacting electromagnetic terminals and circuit connections, 6 represents the box or receptacle made of any preferred material and adapted to be secured, as already described in connection with Fig. 1 of the drawings, to the cross-ties by bolts 8, passing through openings 42 in lugs or ears 7, each branch feeder 10 extending into its switch-box or contact-receptacle through a tubular projection 9 and thoroughly insulated at that point. The upper edge of the box 6 is preferably provided with a groove or recess 46, which may be filled with asphaltum or other insulating material adapted to effect a water-tight joint, and the iron, steel, or equivalent top or cover 12 is provided with a rib 48, adapted to fit within the groove when in position, said top or cover being secured to the box or receptacle by bolts or in any preferred manner. At one side of the top or cover and integral therewith is an extension 49, in which is formed a conical hole or opening adapted to receive a conical metallic sleeve 51, the arrangement being such that when the end of the bond-wire or conductor 13 is placed therein the parts may be securely wedged together in such manner as to form a perfect conducting-joint. Near the bottom of the box or receptacle is a ledge 33, extending either entirely around the inner surface thereof or formed in the faces of two of the sides thereof, said ledge being adapted to sustain a removable bottom or tray 25, made, preferably, of slate or creosoted wood and constituting the support for the switching mechanism and its adjacent parts, there being in the box below this bottom or tray 25, when in position, a chamber 34 of sufficient dimensions to inclose a resistance 18, adapted to furnish to the magnetizing-coils wound around the cores 76 of the electromagnetic terminal and connected directly in circuit with the shunt 22 15, the desired quantity of current to cause the terminal when excited or energized to move upward and establish contact with the interior surface of the top or cover 12, said top or cover being in effect a stationary armature. The bipolar magnetic cores 76 of the terminal are secured to a magnetic yoke 68, which in turn is supported by bolts 32 32, passing through bolt-holes 29 29 in two of the arms of a four-armed cross-bar 59, the other arms of which cross-bar are secured directly to the upper or free ends of the flexible bands or conductors 60 and folded back and forth in the manner shown in Figs. 7 and 15. The lower ends of these flexible bands or conductors 60 are secured directly to the inner end of the branch feeder 10 by a metallic clamp 45 and bolts 28 28, which clamp in turn rests directly upon the removable bottom or tray 25. The enlarged upper ends 78 of the magnetic core 76 are rectangular in shape and present flat surfaces on their upper sides. 75 represents the contact-plate of the movable electromagnetic terminal, the same consisting, preferably, of a sheet of hard-rolled copper or other equivalent non-magnetic material covering the upper faces of the rectangular-shaped enlarged ends 78 and slitted, as shown, so as to present on each side three or more yielding fingers. The outer ends of this contact-plate 75 are bent upward, as shown, and it (the plate) is frictionally connected with the bipolar cores of the electromagnet by a flanged cleat 77, the flanges of which fit snugly over the adjacent edges of the rectangular-shaped enlarged ends 78, the structure being such that when the parts are assembled there is substantially a "tongue-and-groove" connection between them. After the parts are thus assembled the ends of the flanges of the cleat are bent laterally around the corners of the rectangular-shaped enlarged ends 78, as shown at 79 79, Fig. 10, thus firmly uniting them all together. The cleat 77 and the contact-plate 75 are each provided with a hole or opening, and to the lower surface of the cleat 77 is secured a guide-tube 80, said parts being arranged so as to receive the upper end of a brass or other non-magnetic guide pin or rod 56, secured to a supporting metallic base 55, attached to the bottom or tray 25, which guide-rod when in position extends upward through an opening 30 in the cross-bar 59 and a corresponding opening in the yoke 68, the entire arrangement being such that the electromagnetic terminal is yieldingly connected to the flexible bands or conductors 60 and adapted to move freely upward under the action of an exciting-current in the coils around the cores 76 and downward under the action of gravity, the contact-plate 75 making electrical connection with the smooth under surface of the magnetic top or cover 12, the same being in effect, as before stated, a stationary armature. This contact-plate 75 serves an especial function, in that it is of copper or equivalent non-magnetic material and therefore tends to overcome the action of any residual magnetism which may remain in the cores 76 by reason of the approximately-completed magnetic circuit between said cores and the stationary armature or cover 12 when in the upper or closed position. This feature constitutes an important part of the invention, in that it assures the absolute separation of the movable terminal from the stationary armature 12 after the cores have been demagnetized, the plate 75 not only preventing the action of said residual magnetism, but acting also by reason of its resilient yielding nature to force the terminal away from the stationary armature.

In Figs. 11 and 12 of the drawings I have shown a modified form of the contact-plate 75, the same in this instance being in the nature of a carbon plate of the desired thickness and of an area sufficient to cover the surface of the enlarged ends 78, said plate being secured to the enlarged ends by a cleat 77 and two or more bolts 85, located on opposite sides of the hole or opening through which the guide pin or rod 56 passes.

In Figs. 12 and 13 is shown the added feature of what I term the "feeder-coils," which are adapted to aid the shunt-coils in holding the terminal in its upper or contacting position. These coils are here illustrated by the number 23 and are of much larger current-carrying capacity than are the coils included in the shunt 22 15, their function being to convey the working current around the cores 76 in such manner as to insure complete magnetization of the cores after contact has been effected between the movable electromagnetic terminal and the stationary armature or cover 12. Said coils are connected at one end by binding-bolts 66 to the free ends of the flexible bands or conductors 60 and then wound in proper direction around the cores 76 to give to them the same polarity as was given them by the shunt-coils, the other end of the coils 23 being connected by a binding nut or bolt 67 and clip 69 directly to the yoke 68, and hence to the cores 76. It will be noted, however, that the cross-bar 59 in this instance should either be entirely of insulating material, such as vegetable fiber or the like, or that the yoke and cores should be normally insulated from the flexible bands or conductors 60, it being obvious that no current should pass through the cores until after the preliminary excitation thereof by the coil included in the shunt 22 15, as will be more particularly described with the description of the mode of operation on reference to Fig. 3 of the drawings.

Referring now to Fig. 2 for a correct understanding of the operation of the invention, it will be understood that the current-collector or trolley-shoe 16 is supposed to be always in mechanical and electrical contact with any pair or of two adjacent pairs of sectional contacting or working conductors 4 4 over which it is passing as the car advances in either direction, so that normally all of the contacting electromagnetic terminals 17 are in their lower or disconnected positions, except such as may be receiving current through the coils thereof as the car passes over them. Before starting a car from the power-house, therefore, or from any other point when the current is lost or broken it is necessary to establish the current through the coils of such of the electromagnetic terminals 17 as may be connected with the sectional working conductors 4 4, upon which the current-collector or trolley-shoe rests. In this diagrammatic view the car, which is supposed to be passing from left to right, has carried the current-collector or trolley-shoe 16 out of contact with the first pair of twin conductors 4 4, and it now rests wholly upon the second pair, bridging the same, current having been conveyed from the first pair through the current-collector or trolley-shoe and the preliminary energizing coils of the electromagnetic terminal 17 by way of the shunt 22 15, so that the working current from the power-house dynamo or generator D now passes from the + pole thereof by way of the conductor 19, current-feeder or main 11, branch feeder 10, flexible bands or conductors 60, cores of the electromagnetic terminal 17, the fingers of the copper contact-plate 75, (see Figs. 7 and 8,) magnetic top or cover 12 of the switch-box or contact-receptacle, bond-wire or conductor 13, right-hand twin working conductor 4, current-collector or trolley-shoe 16, conductor 21, controller C, electric motor M, conductor 24, right-hand wheel *w*, track or service rail 1, by conductor 20 to the — pole of the generator D, thus furnishing the working current to the motor. A branch or shunt circuit is formed at the same time from the current-collector or trolley-shoe 16 by way of the shunt 22 15, coils of the electromagnetic terminal 17, resistance 18, track or service rail 1, by conductor 20, the same maintaining the electromagnetic terminal in its upper or contacting position. As the car advances the next succeeding electromagnetic terminal will be lifted in the same way, the terminal now in contact with the stationary armature or cover 12 falling away from the same as the current-collector or trolley-shoe leaves the pair of twin working conductors upon which it now rests.

By the arrangement illustrated in the diagrammatic view, Fig. 3, the right-hand set of twin or double working conductors is done away with and contacting blocks 4 4 are arranged in pairs to supplant the same, this arrangement being possible by reason of the action of the feeder-coils 23, as will now be explained. With this arrangement of circuit connections the current passes from the + pole of the power-house dynamo or generator D by the current-feeder or main 11, branch feeder 10, flexible bands or conductors 60 to the binding-bolts 66, (see Figs. 12, 13, and 14,) through feeder-coils 23 to the binding-bolts 67, thence through the yoke 68, cores 76 of the bipolar magnet, contact-plate 75, stationary armature or cover 12 of the box or contact-receptacle, by bond-wire or conductor 13 to the contacting or working conductor 4, thence by the current-collector or trolley-shoe 16, conductor 21, controller C, the motor M, conductor 24, left-hand wheel *w*, track or service rail 1, and conductor 20 to the — pole of the generator. A branch circuit is formed at the same time through the current-collector or trolley-shoe 16, the contact-block 4, upon which the trolley-shoe now rests, shunt 22 15, the preliminary exciting-coils of the electromagnetic terminal 17, resistance 18, right-hand track or service rail 1, right-hand wheel *w*, conductor 24, left-hand wheel *w*, left-hand track or service rail 1, and conductor 20 to the generator, so that both coils are now acting to hold the terminal in its upper or contacting position with the stationary armature or cover 12. Owing to the fact that after the electromagnetic terminal 17 is once moved to its upper position and because all of the working current passes through the feeder-coils 23 before it passes through the cores of the magnetic terminal, said terminal will be held always in its upper position, while the current-collector or trolley-shoe is passing between the contacting blocks 4.

In the arrangement shown in Fig. 4 the twin conductors 4 4 are supplanted by pairs of contacting blocks or pins 4 4, and the current-collector or trolley-shoe is of a length sufficient to bridge the distance between any two adjacent pairs thereof. The operation of this arrangement of circuits is not materially different from the operation of the arrangement disclosed in Fig. 2, and the current flow may be readily traced.

In the arrangement shown in Fig. 5 the operation will be understood in view of what has been said in connection with Figs. 2 and 4, the only difference in the circuit arrangement being as to the relation of the contacting or working conductors 4 4 in the road-bed, all of these modified circuit arrangements being disclosed for the purpose of showing how my novel form of independent electromagnetic terminal may be utilized with various arrangements of working circuits and circuit connections.

By the expression "free or independent contacting electromagnetic terminal" hereinbefore used and found in the claims which follow I wish to be understood as meaning a contact-terminal in the nature of an electromagnet which moves bodily, freely, and independently through the agency of an energizing or exciting current, passing through coils adapted to magnetize the same and in such manner that it will assume its contacting position with a stationary contact when under the influence of such current and will assume its normal or disconnected position with relation to the stationary contact through the action of gravity when the current is discontinued, and I wish it understood that my claims are generic as to this feature; nor do I limit myself to the especial details of construction hereinbefore described with relation to other features of the invention—such, for instance, as the means described for overcoming the effect of residual magnetism in the cores of the bipolar magnetic terminals after they have been demagnetized by discontinuance of the exciting or energizing current, and although I have shown two devices by which this result may be attained I do not limit myself to those specific structures, as I wish it to be understood that my claims in this respect are directed particularly to the combination of a free or independent contacting electromagnetic terminal provided with a preliminary means of excitation or magnetization carried thereby together with any equivalent means for nullifying or varying the effect of residual magnetism after the energizing-current is discontinued.

Having thus described my invention, what I claim, and desire to secure by Letters Patent of the United States, is—

1. A free or independent contacting electromagnetic terminal, in combination with means carried thereby for effecting the preliminary excitation or magnetization thereof.

2. A free or independent contacting electromagnet the core of which constitutes the terminal of a feeder-circuit, in combination with means carried thereby for effecting the preliminary excitation or magnetization thereof.

3. A free or independent contacting electromagnet provided with a coil included in a shunt-circuit.

4. A free or independent contacting electromagnetic terminal included in a shunt-circuit and adapted to be actuated in one direction by a current flowing through said shunt and in the other direction by gravitation.

5. A free or independent contacting electromagnet provided with a magnetizing-coil carried thereby, in combination with a resistance included in a shunt-circuit between the working conductors and a track or service rail.

6. A contacting device or terminal for an electric circuit embodying an electromagnet included in a shunt between one or more working conductors and a track or service rail.

7. A free or independent contacting electromagnet operatively connected with circuit connections of which it constitutes a terminal; in combination with means carried thereby for effecting the preliminary excitation or magnetization thereof; sectional working conductors; an armature electrically connected with one member of the latter and additional means for aiding the first-named means in maintaining the electromagnet in contact with said armature.

8. A contact system embodying twin working conductors and a contacting electromagnet forming the terminal of a branch feeder; in combination with an energizing-coil carried thereby and connected with one member of the working conductor and a track or service rail.

9. A contact system embodying twin sectional working conductors; an armature connected with one member thereof; a contacting electromagnet having circuit connections therewith, a coil connected with the other member of said conductors and a track or service rail.

10. A contact system embodying twin working conductors; an armature connected with one member thereof; a contacting electromagnet having circuit connections therewith, and a coil connected with the other member of said conductors; together with a resistance connected in circuit with said coil and with a track or service rail, all being so arranged as to cause said electromagnet to be lifted into contact with the armature when the energizing-circuit is closed.

11. A contact system embodying sectional working conductors; an armature connected with one member thereof; a contacting electromagnet having circuit connections therewith; a coil upon said electromagnet connected with the other member of said working conductor and with the track or service rail and a current-collector or trolley-shoe carried by the vehicle, said current-collector being adapted to bridge or span the working conductors and to close the circuit through the coil in such manner as to lift the electromagnet into contact with the armature and close the supply-circuit through the other member of the working conductors.

12. A contacting device embodying a contacting bipolar electromagnet, the cores of which are provided with a coil connected with a working conductor and a track or service rail.

13. A contact system provided with a switch-box or receptacle having a guide pin or rod; a contacting electromagnet mounted freely or independently thereon; together with means carried by said electromagnet for effecting the preliminary excitation or magnetization thereof.

14. A contact system provided with a switch-box or receptacle and a contacting electromagnet movably mounted therein, said electromagnet having a coil connected with a working conductor and a track or service rail in such manner as to lift said contacting electromagnet into contact with the inner surface of the switch-box or receptacle.

15. A contact system provided with a switch-box or receptacle and an electromagnet movably mounted therein, said electromagnet having circuit connections with a source of current-supply and provided with a coil adapted to lift it into contact with the inner surface of said receptacle and to close the source of current-supply thereto.

16. A contact system provided with a switch-box or receptacle; a contacting electromagnet movably mounted therein and having circuit connections with a source of current-supply, said electromagnet being provided with a coil connected in circuit with a resistance adapted to reduce the current sufficiently to energize the electromagnet and close the source of current-supply to the switch-box or receptacle.

17. A contact system provided with a switch-box or receptacle; an electromagnet movably mounted therein, said electromagnet having a coil for effecting the preliminary excitation or magnetization thereof and flexible connections between it and the source of current-supply adapted to afford to the magnet a free and independent movement under the influence of the energizing-current and gravity respectively.

18. A contact system provided with a switch-box or receptacle having connections with a source of current-supply; an electromagnet movably mounted therein and having a coil for effecting the preliminary excitation or magnetization thereof; a connector or clamp attached to said circuit connections and flexible connections between said clamp and the electromagnet whereby the latter is capable of free and independent movement within the switch-box or receptacle.

19. A contact system provided with a switch-box or receptacle having circuit connections with an electromagnet movably mounted therein, said electromagnet being provided with a coil for effecting the preliminary excitation or magnetization thereof; in combination with a resistance in circuit with the magnet; a connector or clamp for uniting the circuit connections to the current-feeder or main; together with flexible bands or conductors attached to said connector or clamp and the electromagnet, the arrangement being such as to permit of the free or independent movement of the electromagnet.

20. A contact system embodying twin working conductors; a switch-box or contact-receptacle bonded to one member thereof; an electromagnet movably mounted within said switch-box or receptacle and having an energizing-coil connected with the other member of said twin conductors; together with a track or service rail and flexible conductors connecting said electromagnet and a source of current-supply, whereby said electromagnet may be lifted into contact with said receptacle when the circuit is closed through said energizing-coil and the bonded member of the working conductor is included in circuit.

21. An electromagnet provided with an energizing coil and circuit connections, said electromagnet having a contact-plate provided with "tongue-and-grooved" connections therewith.

22. An electromagnet provided with an energizing-coil and circuit connections; a cleat carrying a contact-plate secured upon said electromagnet by bending the ends of the flanges around the corners of the enlarged ends thereof.

23. A contact system provided with a switch-box or receptacle; an electromagnet movably mounted therein and having an energizing-coil and circuit connections; together with a contact-plate frictionally connected with said electromagnet, the arrangement being such as to overcome the effect of residual magnetism during the operation of the device.

24. A free or independent contacting electromagnetic terminal provided with means carried thereby for effecting the preliminary excitation or magnetization thereof; in combination with means for overcoming the effect of residual magnetism during the operation thereof.

25. An electromagnet having an energizing-coil; a connector or arm 59 attached to said electromagnet; a connector or clamp having circuit connections with flexible bands or conductors, the connector-arm and the clamp, in such manner as to convey the current to said electromagnet.

In testimony whereof I have hereunto subscribed my name this 16th day of May, 1900.

WILLIAM GRUNOW, JR.

Witnesses:
C. J. KINTNER,
M. F. KEATING.